US006968131B2

(12) United States Patent
Obeda et al.

(10) Patent No.: US 6,968,131 B2
(45) Date of Patent: Nov. 22, 2005

(54) TOPOLOGY DISCOVERY IN OPTICAL WDM NETWORKS

(75) Inventors: Paul David Obeda, Nepean (CA); Robert Michael Bierman, Nepean (CA); Cuong Tu Dang, Ottawa (CA); David Edward Nelles, Nepean (CA); Udo Mircea Neustadter, Carp (CA)

(73) Assignee: Tropic Networks Inc., Kanata (CA)

( * ) Notice: Subject to any disclaimer, the term of this patent is extended or adjusted under 35 U.S.C. 154(b) by 804 days.

(21) Appl. No.: 09/963,501

(22) Filed: Sep. 27, 2001

(65) Prior Publication Data
US 2003/0058496 A1 Mar. 27, 2003

(51) Int. Cl.[7] ............................................. H04J 14/04
(52) U.S. Cl. ............................ 398/34; 398/25; 398/32
(58) Field of Search ............................ 398/7, 14, 25, 398/32, 34

(56) References Cited

U.S. PATENT DOCUMENTS

| 5,727,157 A | 3/1998 | Orr et al. ............... 395/200.54 |
| 5,729,685 A | 3/1998 | Chatwani et al. ...... 395/200.11 |
| 5,796,736 A | 8/1998 | Suzuki ....................... 370/399 |
| 5,892,606 A | 4/1999 | Fatchi et al. ................ 359/177 |
| 6,108,113 A | 8/2000 | Fee ............................. 359/124 |
| 6,108,702 A | 8/2000 | Wood .......................... 709/224 |

FOREIGN PATENT DOCUMENTS

| EP | 0 959 579 A | 11/1999 |
| EP | 1 081 982 A | 3/2001 |

OTHER PUBLICATIONS

Sengupta, S., et al, "From Network Design to Dynamic Provisioning and Restoration in Optical Cross-Connect Mesh Networks: An Architectural and Algorithmic Overview", IEEE Network, Jul.-Aug. 2001, IEEE, USA, vol. 15, No. 4, Jul. 2001, pp. 46-54, XP002250120, ISSN: 0890-8044.

Heismann, F., et al, "Signal Tracking and Performance Monitoring in Multi-Wavelength Optical Networks", Proceedings of the European Conference on Optical Communication, XX, XX, 1996, pp. 47-50, XP000923426.

*Primary Examiner*—Leslie Pascal
(74) *Attorney, Agent, or Firm*—Victoria Donnelly (57) ABSTRACT

In an optical WDM network, each optical channel is modulated with a respective channel identity. Detectors, conveniently at multiplex ports of optical band filters, detect the channel identities of all of the optical channels in an optical signal at the respective points to produce respective channel lists. A network management system determines channel lists for through ports of the optical band filters, identifies matching pairs of channel lists to determine a topology of each node and to identify optical paths entering or leaving each node, and identifies matching pairs of channel lists for these paths to determine an inter-node topology of the network. The channel identity detector points can alternatively be at the optical paths entering or leaving each node.

15 Claims, 4 Drawing Sheets

TOPOLOGY DISCOVERY IN OPTICAL WDM NETWORKS

This invention relates to topology discovery in optical WDM (wavelength division multiplex) communications networks or systems.

BACKGROUND

As communications networks become more complex, the task of network management becomes increasingly difficult. An important aspect of a network management system, or NMS, relates to determining and maintaining an accurate record of the topology or connectivity of the network. In optical WDM communications networks this may involve knowledge of not only connections of optical fibers among nodes of the network, but also connections of optical fibers within the nodes, allocation of wavelengths to respective optical fibers, and arrangements and sequences of multiplexers and demultiplexers, or optical band filters, within the nodes.

While it is conceivable to provide and maintain manually a record of the topology of a network, this becomes increasingly impractical as the network becomes more complex, and has other disadvantages such as being subject to errors and being slow and inconvenient to update and respond to changes.

In communications networks it has been proposed to provide automatic discovery of the topology of the network. For example, such proposals are disclosed for ATM networks in Suzuki U.S. Pat. No. 5,796,736 issued Aug. 18, 1998 entitled "ATM Network Topology Auto Discovery Method" and in Chatwani et al. U.S. Pat. No. 5,729,685 issued Mar. 17, 1998 and entitled "Apparatus For Determining The Topology Of An ATM Network Or The Like Via Communication Of Topology Information Between A Central Manager And Switches In The Network Over A Virtual Service Path".

As disclosed in the latter patent, ATM cells include so-called link advertisement messages (LAMs) each of which identifies an originating switch and port number and is forwarded by a receiving or neighbour ATM switch to a network manager. The network manager thereby develops information profiling the topology of the network. Matching of LAM pairs is carried out by the network manager to confirm bidirectional NNI (Network-Network Interface) links.

While such a known arrangement may be effective for discovering neighbours in an ATM network, it requires handling of the LAMs specifically in each ATM switch and reduces bandwidth of the network for data traffic. In addition, such a known arrangement is not effective for determining the topology of an optical communications network, in which for example an optical fiber path between two nodes A and B may pass through an intermediate node C. The ATM cell or packet level which would be determined by such a known arrangement would indicate that the nodes A and B are coupled together and would not show the node C, whereas the actual topology in this case is that the node A is coupled to the node C, and the node C is coupled to the node B.

Also, Wood U.S. Pat. No. 6,108,702 issued Aug. 22, 2000 and entitled "Method And Apparatus For Determining Accurate Topology Features of A Network" discloses a system for monitoring packet traffic in a network to determine topology features using logical groupings of ports and/or devices. Orr et al. U.S. Pat. No. 5,727,157 issued Mar. 10, 1998 and entitled "Apparatus And Method For Determining A Computer Network Topology" discloses determining the topology of a computer network including data-relay devices based on a comparison of source addresses heard by the various data-relay devices.

In an optical network, Fee U.S. Pat. No. 6,108,113 issued Aug. 22, 2000 and entitled "Method And System For Transporting Ancillary Network Data" discloses superimposing a sub-carrier modulation signal at a relatively low frequency (e.g. 1 MHz), containing ancillary network data, on an optical carrier of a high bit rate (e.g. 1 to 10 GHz) data signal. This patent discloses that the ancillary network data can include any of numerous data types identifying any of numerous network elements, and can be used for any of numerous network management purposes one of which is listed as "Probing Network Topology", but no further information in these respects is disclosed.

Fatehi et al. U.S. Pat. No. 5,892,606 issued Apr. 6, 1999 and entitled "Maintenance Of Optical Networks" discloses an apparatus for adding a dither signal to an optical carrier modulated with an information signal, to provide a method for monitoring and tracking end-to-end signal routing in multi-wavelength optical networks. This patent discloses that the monitoring can take place at any point in the network. This patent is not concerned with topology discovery.

A need exists for an improved method of topology discovery which is particularly applicable to optical WDM networks.

SUMMARY OF THE INVENTION

According to one aspect of this invention there is provided a method of determining topology of an optical WDM (wavelength division multiplex) network in which optical signals comprising a plurality of WDM optical channels are communicated, comprising the steps of: modulating each optical channel with a respective signal comprising a channel identity; detecting the channel identities of all of the optical channels in an optical signal at each of a plurality of points in the network to produce a channel list for each of said points; and identifying matched pairs of channel lists to determine optical paths of the network between pairs of said points.

Another aspect of this invention provides a method of determining topology of an optical WDM (wavelength division multiplex) network in which optical signals comprising a plurality of WDM optical channels are communicated among a plurality of nodes of the network, comprising the steps of: modulating each optical channel with a respective signal comprising a channel identity; for each of a plurality of optical paths entering or leaving each of a plurality of nodes, determining a channel list of all the optical channels in an optical signal on the optical path, this step comprising detecting the channel identities of all of the optical channels in an optical signal at each of a plurality of points; and identifying matching channel lists to determine optical paths of the network between the nodes.

The step of determining a channel list of all the optical channels in an optical signal on an optical path entering or leaving a node can comprise detecting the channel identities of all of the optical channels in an optical signal on the respective optical path.

Alternatively, this step can comprise, for each node; detecting the channel identities of all of the optical channels in an optical signal at a multiplex port of each of a plurality of optical band filters of the node to produce a respective channel list M; determining a respective channel list T for an optical signal at a through port of the respective optical band filter, the channel list T comprising channels of the respective list M which are not within a pass band of the optical band filter; identifying matching channel lists M and T to determine optical paths within the node; and identifying unmatched channel lists M or T as channel lists for optical path entering or leaving the node.

In this case the step of identifying matching channel lists M and T to determine optical paths within the node can comprise identifying any optically transparent optical band filters of the node for each of which the channel lists M and T are the same; identifying matched pairs of the other channel lists M and T for the node to determine optical paths between respective ports of different optical band filters within the node; and identifying any channel lists, from among said matched pairs of channel lists for the node, matching said same channel lists M and T to determine optical connections of said optically transparent optical band filters within the node.

The invention also provides an optical WDM (wavelength division multiplex) network comprising a plurality of nodes and optical paths for communicating optical signals, comprising a plurality of WDM optical channels, within and among the nodes, the network comprising: a source for each optical channel; a modulator for modulating each optical channel with a respective signal comprising a channel identity; a plurality of optical filters for combining optical channels to produce optical signals and for separating optical signals to derive optical channels from the optical signals; a plurality of detectors for detecting the channel identities of all of the optical channels in an optical signal at each of a plurality of points in the network to produce a channel list for each of said points; and a network management system for identifying matched pairs of said channel lists to determine optical paths of the network between pairs of said points.

In such a network the optical filters can comprise optical band filters each having a multiplex port, an add or drop port, and a through port, and said plurality of points in the network can comprise multiplex ports of the optical band filters. Preferably the network management system is arranged to determine a channel list for a through port of an optical band filter by omitting, from optical channels of a channel list for the multiplex port of the respective optical band filter, optical channels within a pass band of the optical band filter.

BRIEF DESCRIPTION OF THE DRAWINGS

The invention will be further understood from the following description by way of example with reference to the accompanying drawings, in which.

DETAILED DESCRIPTION

Figure 1:
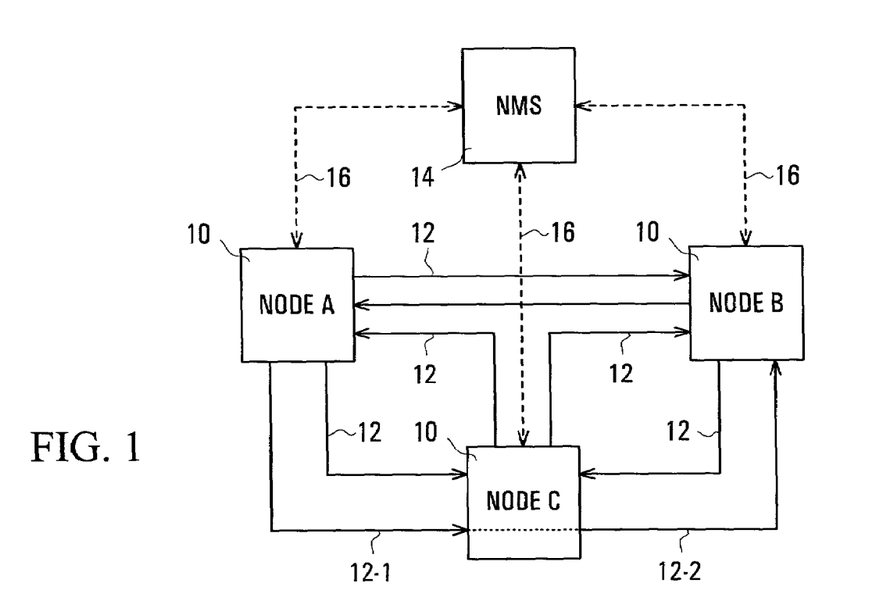
FIG. 1 illustrates a plurality of nodes, a network management system, and communication paths therebetween forming part of an optical WDM communications network incorporating an embodiment of the invention.

Referring to FIG. 1, a simple optical communications network is illustrated as comprising a plurality of, in this example three, nodes 10, identified individually as Node A, Node B, and Node C, which are coupled together via various optical communications paths 12 represented by solid lines. The paths 12 can comprise optical fibers and/or wavelengths on optical fibers. The network also includes a network management system (NMS) or station 14, to which all of the nodes 10 are coupled via communications paths 16 represented by dashed lines. The paths 16 can be optical or other (e.g. electrical) communications paths.

As is known in the art, such a communications network can include an arbitrary number of nodes 10 and NMSs 14, which may be located together or separately from one another, with various arrangements of communications paths among the nodes 10 and NMSs 14 having any desired configuration or topology. Furthermore, such a communications network can be coupled to other similar or different communications networks in various manners. Accordingly, FIG. 1 serves merely to illustrate a simple form of network for the purposes of describing an embodiment of the invention.

As illustrated in FIG. 1, one of the paths 12, from Node A to Node B, is divided into two parts 12-1 and 12-2 which pass through Node C as illustrated by a dotted link in Node C. Although this path may pass via one or more optical filters which can drop or add optical channels in the Node C, it is assumed that no optical channels are dropped from or added to this path in Node C. Thus at a communications level, this path only communicates signals from Mode A to Node B. However, the topology of the network is that this path comprises the path 12-1 from Node A to Node C, and the path 12-2 from Node C to Node B. Discovery of the topology of the network by the NMS 14 is required, for example, to identify the paths 12-1 and 12-2 via Node C.

It can be appreciated that, without any interception of signals on the dotted link path at Node C in the network of FIG. 1, an analysis of signals at the communications level will not identify the separate paths 12-1 and 12-2 via Node C, but merely a signal path from Node A to Node B. It can also be appreciated that this is a very simple example, and that in practice an optical network may include far more than three nodes, which may include multiple optical band filters for multiplexing and demultiplexing numerous different wavelength optical signals in a WDM network, and that there may be far more optical communication paths, so that automatically and accurately determining the topology of the network by the NMS 14 can be a very difficult task.

In embodiments of this invention, carrying out this task is facilitated by providing each optical signal within the network with a respective identifier, referred to as a channel identity or CID. The CID is applied as a relatively low frequency (e.g. about 1 MHz or less) amplitude modulation of the optical signal, referred to as a dither tone, using any desired coding scheme for the CID.

As one example, each CID may be constituted by a repeated sequence of 14 bytes of data identifying the CID. Numerous other ways of encoding unique CIDS for the respective optical signals exist and any of these can be used, with appropriate forms of detection and decoding of the CIDs.

Figure 2:
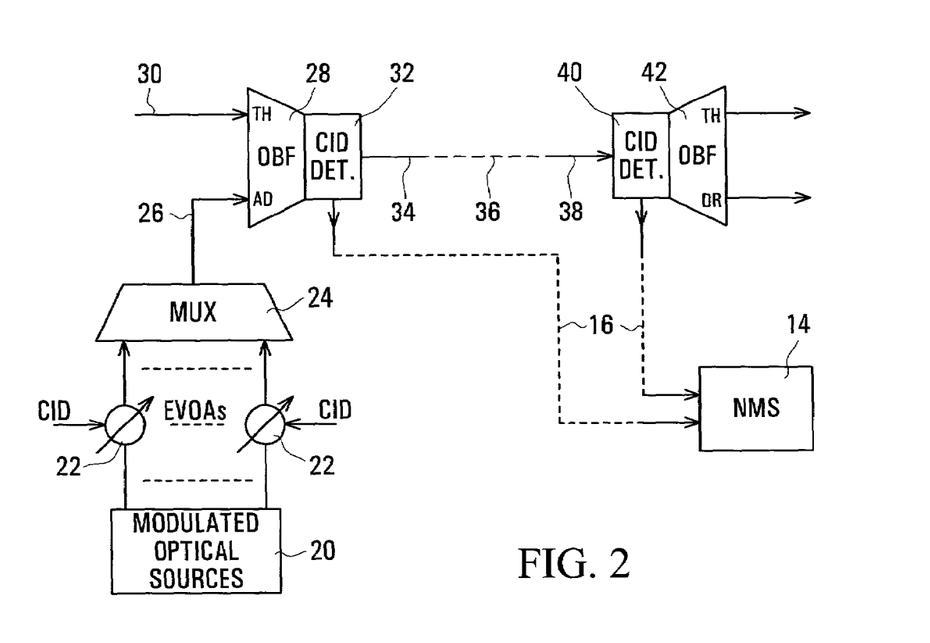
FIG. 2 illustrates apparatus provided in one or more of the nodes in accordance with an embodiment of the invention.

FIG. 2 illustrates apparatus provided in one or more of the nodes in accordance with an embodiment of the invention. As illustrated in FIG. 2, each optical signal or channel, for example supplied from a respective one of a plurality of optical sources 20 modulated with respective data signals (not shown), is supplied via a respective one of a plurality of electronic variable optical attenuators (EVOAs) 22 supplied with respective CIDs, whereby each optical signal or channel is modulated with a respective CID as indicated above. As illustrated in FIG. 2 for a WDM network, optical signals with their respective CIDs are multiplexed in an optical multiplexer 24 to produce optical signals within an optical band on an optical path 26.

The optical path 26 is coupled to an add port AD of an optical band filter (OBF) 28 which serves to multiplex the optical signals on the optical path 26 with other optical channels supplied via an optical path 30 to a through port TH of the OBF 28, These other optical channels on the optical path 30 similarly are provided, for example in the same manner as the signals from the optical sources 20, each with a respective CID. The multiplexed optical signal produced by the OBF 28 is supplied via a CID detector 32 to an optical path 34.

The CID detector 32, for example as further described below, detects the CIDs of all of the optical channels present in the optical signal at the multiplexed output port of the OBF 28 and hence on the optical path 34, and supplies these via one of the paths 16 to the NMS 14.

The optical path 34 should lead to, i.e. supply its optical signal to, an optical input elsewhere in the optical network. For example, it may lead to a through input port of another OBF within the same node as the OBF 28, or to a multiplex input port of another OBF, acting as a demultiplexer or drop filter, within the same node as the OBF 28, or to an input port of another OBF in a different node from that containing the OBF 28.

FIG. 2 illustrates the optical path 34 as being coupled via a path 36, represented by a dashed line, to an optical path 38, which is coupled via another CID detector 40 to the multiplex input port of another OBF 42 having through and drop output ports TH and DR respectively providing demultiplexed optical output signals. Like the OBF 32, the CID detector 40 detects the CIDs of all of the optical channels present in the optical signal at the multiplexed input port of the OBF 42, and hence on the optical path 38, and supplies these via one of the paths 16 to the NMS 14.

It can be appreciated from the above description that the optical path 36 may comprise an optical fiber between two different nodes, one of which includes the OBF 28 and the other of which includes the OBF 42, or it may comprise an optical path within a node, the OBFs 28 and 42 both being within this one node. As described above, the NMS 14 may be separate from the nodes, incorporated within a node, or distributed among nodes, with the paths 16 being provided accordingly.

Figure 3:
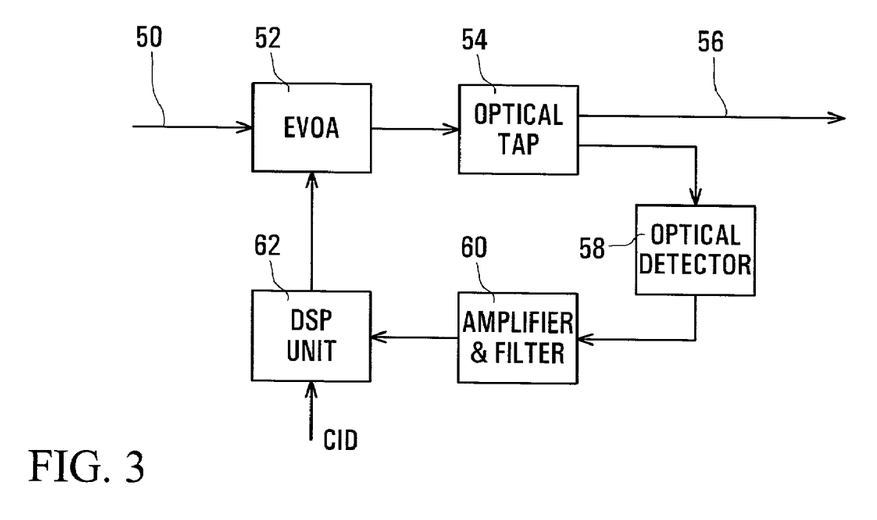
FIG. 3 illustrates one form of modulator which can be used in the apparatus of FIG. 2.

FIG. 3 illustrates one form of modulator which can be used in the apparatus of FIG. 2, for implementing each of the EVOAs 22 as shown in FIG. 2.

Referring to FIG. 3, an optical signal to be provided with a CID is supplied via an optical path 50, an EVOA 52, and an optical tap 54 to an output optical path 56. A small portion, e.g. 5%, of the optical signal which is tapped by the optical tap 54 is detected by an optical detector 58, whose electrical output is amplified and filtered by an AGC amplifier and filter unit 60, an output of which is supplied to a digital signal processor (DSP) unit 62. The DSP unit 62 provides a controlled voltage bias to the EVOA 52 in accordance with a respective CID for the optical signal, with which the DSP unit 62 is supplied for example from the NMS 14. The modulator of FIG. 3 can modulate the optical signal with a desired amplitude modulation depth, for example of about 1% to about 4%, at frequencies of for example up to about 1 MHz, to provide the desired form of CID modulation on the optical signal.

It is observed that the optical signal is also modulated in known manner with a data signal typically at a high bit rate. As described above with reference to FIG. 2, the CID modulation is applied to each optical signal after its data modulation. It can be appreciated that this need not be the case, and instead the CID modulation can be applied to an optical carrier which is subsequently modulated with data to be carried.

Figure 4:
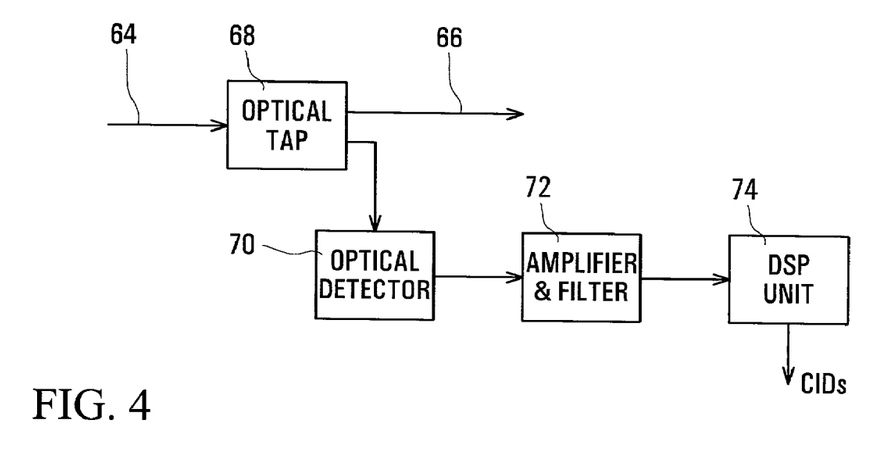
FIG. 4 illustrates one form of detector which can be used in the apparatus of FIG. 2.

FIG. 4 illustrates one form of detector which can be used in the apparatus of FIG. 2, for implementing each of the CID detectors 32 and 40 as shown in FIG. 2.

Referring to FIG. 4, an optical signal at the multiplexed port of an optical band filter, for example at the output of the OBF 28 acting as a multiplexer in FIG. 2 or at the input of the OBF 42 acting as a demultiplexer in FIG. 2, on an optical path 64 is supplied to an optical path 66 via an optical tap 68. A small portion, e.g. 5%, of the optical signal which is tapped by the optical tap 68 is detected by an optical detector 70, whose electrical output is amplified and filtered by an AGC amplifier and filter unit 72, an output of which is supplied to a DSP unit 74. The DSP unit 74 derives the CIDs of all of the optical channels which are present in the optical signal on the path 64, and provides these as an output to the NMS 14.

The forms and functions of the DSP units 62 and 74 depend on the particular form of CIDs used. For example, the DSP unit 62 may incorporate a digital synthesizer and the DSP unit 74 may incorporate a Fast Fourier Transform (FIT) or Discrete Fourier Transform (DFT) function for detecting CID tones.

Figures 5, 6:
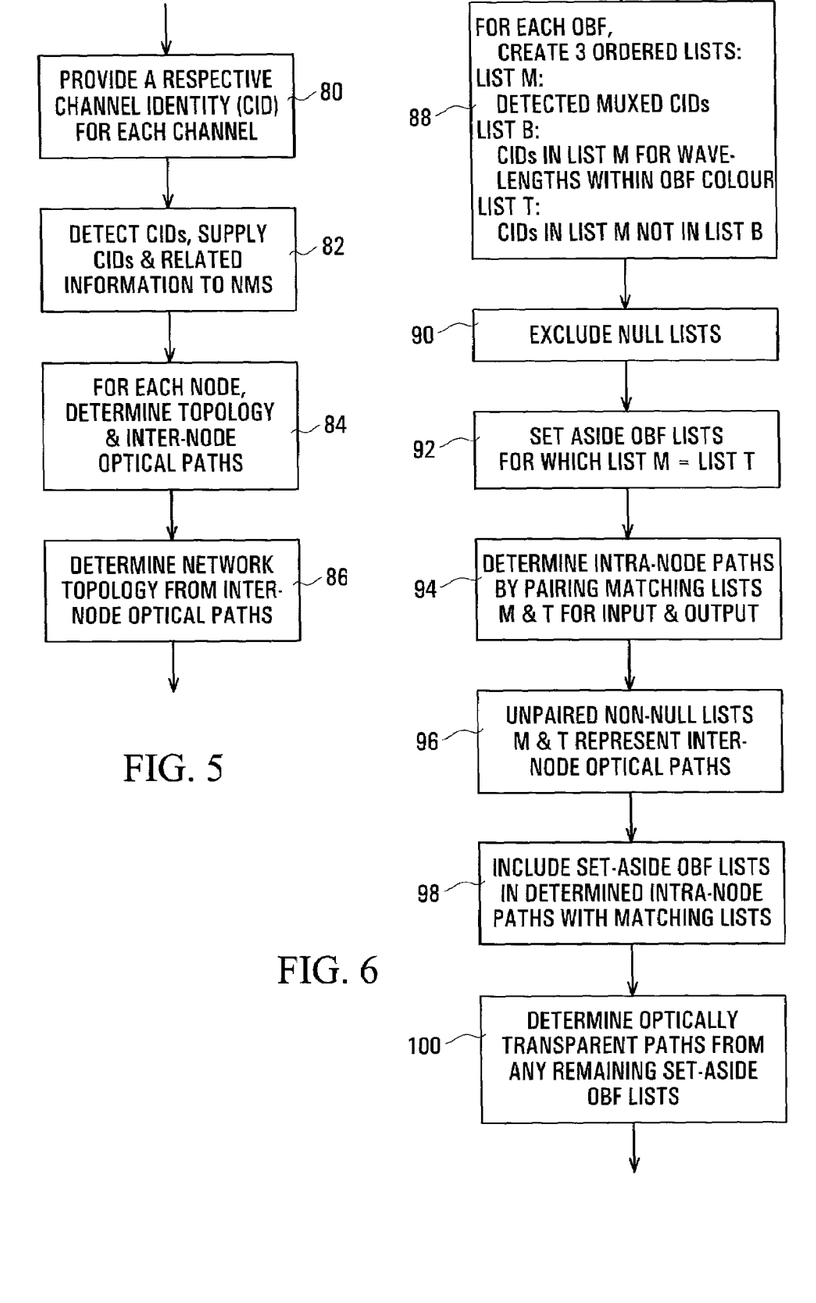
FIG. 5 is a flow chart providing an outline of steps carried out in performing a method in accordance with an embodiment of the invention.
FIG. 6 is a flow chart illustrating in more detail steps carried out for each node in performing the method represented by FIG. 5.

As indicated above, the provision of a respective CID for each optical channel, and the detection of the CIDs by the CID detectors, is used in a method of determining the topology of the network by the NMS 14 in accordance with an embodiment of this invention. FIG. 5 is a flow chart providing an outline of steps carried out in performing this method.

Referring to FIG. 5, a block 80 represents a first step of providing each optical channel with a respective CID, this being carried out for example as described above with reference to FIGS. 2 and 3. A subsequent block 82 represents a step of detecting the CIDs and supplying these to the NMS 14, this being carried out for example at the multiplexed ports of the optical band filters as described above with reference to FIGS. 2 and 4. In this step the NMS 14 is also supplied with related information as to the "colour" of, i.e. the wavelengths added or dropped by, each respective optical band filter and the direction of the optical signals, i.e. whether the respective optical band filter is acting as a multiplexer like the OBF 28 or as a demultiplexer like the OBF 42, as described above with reference to FIG. 2.

A block 84 in FIG. 5 represents a further step of processing, individually for each node in the optical network, the above information for the respective node to determine from the detected CIDS inter-node optical paths which lead to or from another node, i.e. for each node, each optical path like the path 34 in FIG. 2 which supplies its optical signal to another node, and each optical path like the path 38 in FIG. 2 via which an optical signal is supplied from another node. This step can also determine the topology of optical devices within the individual nodes. A further block 86 in FIG. 5 represents a final step of processing, for the optical network as a whole, the inter-node optical paths to determine the overall topology of the optical network. The steps represented by the blocks 84 and 86 can also provide warnings or alarms to a network operator in the event that errors or faults are determined from the discovered topology.

Accordingly, in the step 82 the NMS 14 is supplied, for each node 10, with the CIDs detected by the CID detectors, such as the detectors 32 and 40 as described above, at the multiplex port of each OBF of the respective node, together with information as to the colour of the OBF and the optical signal direction, i.e. whether this multiplex port is an optical input or an optical output. For each node, the NMS carries out the step 84 in FIG. 5, for example in accordance with the more detailed steps of FIG. 6. Thus steps 88 to 100 of FIG. 6 serve to implement the step 84 of FIG. 5.

Referring to FIG. 6, in the step 88 the NMS 14 creates, for each OBF of the respective node 10, three ordered lists of CIDS, referred to as lists M, B, and T. The list M is a list of all of the CIDs detected by the respective CID detector at the multiplex port of the OBF, supplied in the step 82. The list B is a subset of the list M, limited to the CIDs in the list M for optical channels with wavelengths that are within the colour of the OBF, i.e. these wavelengths are selected by the band filter to be coupled between the add port AD or drop port DR and the multiplex port of the OBF, so that the list B contains the CIDS of optical channels that are added or dropped by the OBF. The list T contains the other CIDs, i.e. the CIDs of the list M which are not in the list B, representing optical channels which are present at the through port TH of the OBF. Each of these lists also has an associated indication of whether it relates to optical channels at an input to or an output from the respective OBF.

In determining the intra-node and inter-node topology of the optical network, each of the created lists is used as an identity for the optical path or fiber at the respective port of the respective OBF and node. Any of these lists created in the step 88 can be a null list, i.e. an empty list containing no CIDS; for example a null list would be created for an OBF port which is unconnected and carries no optical signals. At the step 90 in FIG. 6, null lists are excluded from the further topology-determining steps.

In the step 92, any lists for OBFs for which the lists M and T are the same (except for the signal input/output association) are temporarily set aside. Such lists correspond to OBFs for which no optical channels are added or dropped, so that the lists of CIDs at the multiplex and through ports of the OBF are the same. An example of this is further described below with reference to FIG. 7.

In the step 94, optical paths within the respective node 10, i.e. intra-node paths, are determined by the NMS 14 by matching pairs of the remaining lists M and T for the node, one list of each pair being an output from one OBF and the other list of the respective pair being an input to another OBF of the node. Thus each such matched pair of lists also represents an optical path or fiber between the ports associated with the lists.

In the subsequent step 96, it is concluded that the remaining lists M and T, i.e. those that are not null, set aside, or paired within the node, represent ports of the node that are coupled to other nodes, and hence the optical paths or fibers coupled to these ports. The lists B identify their respective ports as add or drop ports, depending upon whether the ports are input or output ports. Except for OBFs whose lists have been temporarily set aside, the topology of the node, i.e. the optical paths between OBFs of the node, is thereby determined.

In the step 98, the list M (or the list T which is the same) of each OBF whose lists have been temporarily set aside are matched with the lists of the optical paths of the node determined in the steps 94 and 96, and the determined intra-node topology is expanded to include these OBFs in the respective optical paths. As further described below, where an optical path includes only one such OBF, its position and optical connections are thereby fully determined, but for an optical path including two or more such OBFs the order of such OBFs within this optical path is undetermined (but this is relatively unimportant because such OBFs do not add or drop any optical channels).

In the final step 100 of FIG. 6, it is concluded that any remaining matching lists M and T which were set aside in the step 92 relate to OBFs which are optically transparent within the node, i.e. these lists relate to at least one OBF which is coupled between ports of the node that are coupled to other nodes, but which OBF does not drop or add any optical channels so that the node is optically transparent to the associated optical signal.

For example, if for a particular OBF in the node the list M relates to an input port of the OBF and the list T relates to an output port of the OBF, and these lists are the same and not null, then they are set aside at the step 92. If at the step 98 these lists are not matched with another list in the node, then it is concluded at the step 100 that the list M for this OBF constitutes an input optical path of the node, the list T represents an output optical path of the node, and that optical signals are coupled transparently, i.e. without any dropping or adding of optical channels, from this node input to this node output via this OBF, As in the case of the step 98, if at the step 100 it is determined that the matching lists M and T of a plurality of OBFs in the node are the same, then it is concluded that these OBFs are coupled in sequence with one another and that the particular order of the OBFs in this sequence can not be determined.

Figure 7:
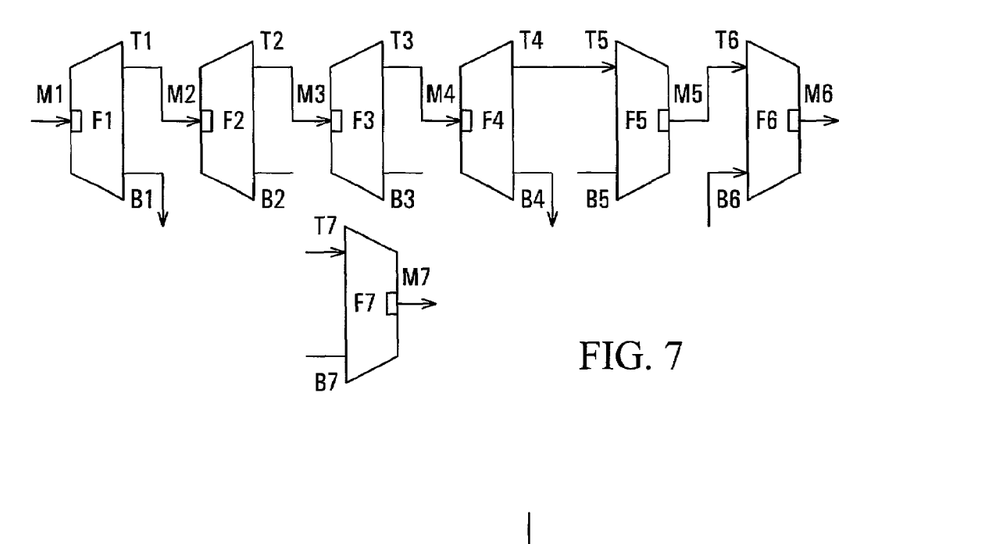
FIG. 7 illustrates a plurality of optical band filters with reference to which an aspect of an embodiment of the invention is explained.

The steps of FIG. 6 are further explained by way of example with reference to FIG. 7, which illustrates one of numerous possible arrangements of OBFs within a node. As shown in FIG. 7, the node is assumed to contain seven OBFs which are identified as band filters F1 to F7. As illustrated, the OBFs F1 to F4 are arranged as drop or demultiplexing filters, and the OBFs F5 to F7 are arranged as add or multiplexing filters. For each of the filters F1 to F7, a rectangle at the multiplex port of the filter represents the presence of a respective CID detector as described above. For the drop filters F1 to F4 the multiplex port is an optical input, and for the add filters F5 to F7 the multiplex port is an optical output, of the respective OBF.

In the step 88 of FIG. 6, the three ordered lists M, B, and T are created by the NMS 14 for each of the OBFs F1 to F7. For clarity, these lists are represented as M1, B1, and T1 for the OBF F1, M2, B2, and T2 for the OBF F2, and so on, and these list designations are illustrated in FIG. 7 adjacent to the OBF ports to which they relate. It can be appreciated that the lists M1 to M4, B5 to B7, and T5 to T7 are identified as optical inputs for their respective OBFs, and the other lists are identified as optical outputs for their respective OBFs.

As illustrated in FIG. 7, it is assumed that no optical channels are dropped by the OBFs F2 and F3, and that no optical channels are added by the OBFs F5 and F7, so that their drop/add ports are unconnected and the lists B2, B3, B5, and B7 are null lists and are excluded at step 90 in FIG. 6. Further, for each of these OBFs F2, F3, F5, and F7 the respective list T is the same as the respective list M, so that these lists for these OBFs are set aside at step 92 in FIG. 6.

Of the remaining lists M and T, in the step 94 of FIG. 6 the NMS 14 pairs the list T1 (output) with the list M4 (input), and pairs the list T4 (output) with the list T6 (input), in each case concluding that there is an optical path between the ports corresponding to the paired lists. In the step 96 of FIG. 6 the NMS 14 concludes correctly that the remaining lists M and T, i.e. the lists M1 and M6, correspond to inter-node optical paths, i.e. respectively an input port and an output port of the node, to which inter-node optical paths or fibers are coupled. The NMS 14 also recognizes from their input and output associations that the lists B1 and B4 relate to optical channels dropped in the node and that the list B6 relates to optical channels added in the node.

In the step 98 of FIG. 6, the NMS 14 matches the set-aside lists M2 and M3 each to the list T1 or M4 to determine that the OBFs F2 and F3 are present in the optical path T1-M4 as determined above, but it can not determine the order of the OBFs F2 and F3 within this optical path (i.e. whether the OBF F2 precedes the OBF F3 as illustrated, or whether the OBF F3 precedes the OBF F2). In addition, the NMS 14 matches the set-aside list M5 to the list T4 or T6 to determine that the OBF F5 is present in the optical path T4-T6 as determined above; in this case it concludes by matching inputs and outputs that there are optical paths T4-T5 and M5-T6.

There is no match in the step 98 for the list M7, Accordingly, in the step 100 of FIG. 6 the NMS 14 concludes that the list T7 (input) and the list M7 (output) relate respectively to an input port and an output port of the node, corresponding to inter-node optical paths, and that the OBF F7 provides an optically transparent coupling from this input port to this output port of the node.

It should be appreciated that the simple example of FIG. 7 is provided only by way of additional explanation of the steps of FIG. 6, and that these steps can be carried out to determine arbitrary topologies of nodes.

In the step 86 of FIG. 6, the NMS performs a sequence of steps to determine the inter-node, or network, topology in a manner which is generally similar to that described above for determining the intra-node topology for each node. Steps 102, 104, and 106, illustrated in FIG. 8 and further described below, constitute the step 86 of FIG. 6 and generally correspond for the network topology to the steps 92, 94, and 98 respectively of FIG. 6 as described above for the node topology. To this end, the NMS 14 makes use of the lists M and T, e.g. M1, M6, M7, and T7 as described above with reference to FIG. 7, which it has concluded in the steps 96 and 100 represent inter-node optical connections for each node. A further step 108 in FIG. 8 provides an optional additional sanity check for the network.

Figure 8:
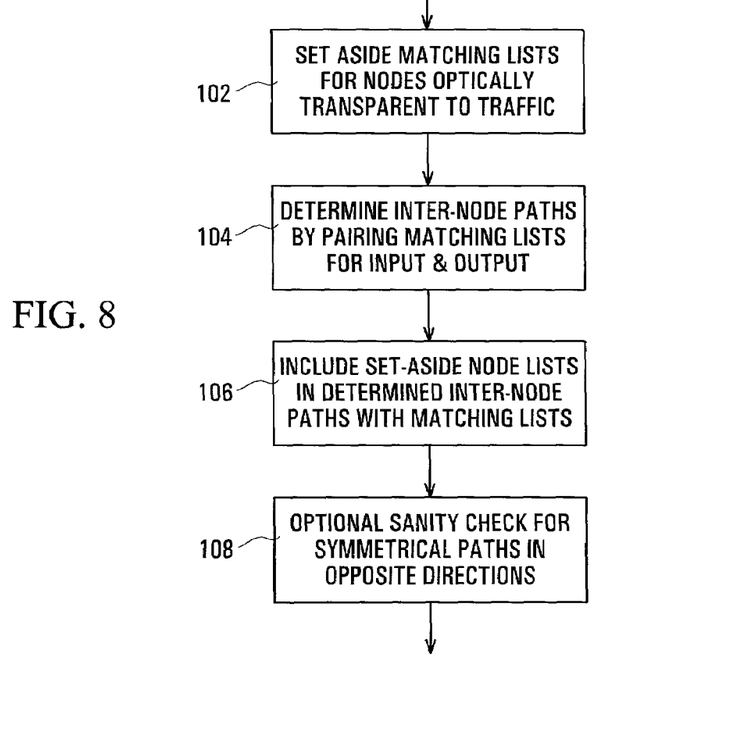
FIG. 8 is a flow chart illustrating steps carried out for the network in performing the method represented by FIG. 5.

Referring to FIG. 8, the NMS 14 initially determines at the step 92 whether any node has two matching lists for input and output; if so these are set aside with the conclusion that the node is optically transparent to the optical channels to which these lists relate. Using the example of FIG. 7, the NMS 14 determines that the respective node has matching lists T7 and M7 for two of its inter-node ports, and accordingly these are set aside in the step 92, the node being optically transparent for optical traffic between these ports.

In the step 104, the NMS 14 determines inter-node paths by matching pairs of the remaining inter-node lists for the network, one list of each pair being an output from one node and the other list of the respective pair being an input to another node of the network. Any unpaired lists are concluded to represent errors (e.g. an unconnected optical fiber) for which a warning or alarm is provided by the NMS 14 to an operator.

In the step 106, the matching lists, for input and output inter-node optical channels, of any node concluded at the step 102 as being optically transparent for this traffic, are matched with lists of the determined inter-node optical paths. The NMS 14 accordingly expands the determined internode topology to include each optically transparent node in the respective inter-node optical path, in a similar manner to that described above for intra-node OBFs which do not add or drop any optical channels. As in that case, in the event that the same inter-node optical path includes a plurality of nodes which are optically transparent to the traffic on the optical path, then the order or sequence of these nodes in the optical path is not determined by the NMS 14.

As indicated by the step 108, the NMS 14 can optionally perform a further sanity check on the determined topology of the network, that incoming and outgoing optical paths are symmetrical with respect to the OBFs to which these opposite-direction optical paths are connected, as is normally the case in an optical network. Such a check facilitates detecting an error of one node receiving optical signals from another node but transmitting optical signals to a third node. Other further and/or additional checks may also be performed by the NMS 14; for example, the determined topology may be compared with a previous topology of the same network to identify any differences.

As described above, the CID detectors are provided at the multiplexed ports of the optical filters, but this need not be the case and the CID detectors can be provided additionally or instead at other points in the optical paths. In addition, as described above there is an initial process (the steps of FIG. 6) of determining intra-node topology and hence ports of each node, and a subsequent process (the steps of FIG. 8) of determining the inter-node network topology, but again this need not be the case.

For example, instead a CID detector may be provided for each optical path entering or leaving each node, i.e. for each node port, to provide a respective list of channels at each node port. The steps 102, 104, and 106 of FIG. 8 as described above can be carried out in respect of these lists, to determine the inter-node network topology without any determination of the topology within each node.

Thus although particular embodiments of the invention are described above, it can be appreciated that numerous modifications, variations, and adaptations may be made without departing from the scope of the invention as defined in the claims.

What is claimed is:

1. A method of determining topology of an optical WDM (wavelength division multiplex) network in which optical signals comprising a plurality of WDM optical channels are communicated, comprising the steps of:

modulating each optical channel with a respective signal comprising a channel identity;

detecting the channel identities of all of the optical channels in an optical signal at each of a plurality of points in the network to produce a channel list for each of said points;

identifying matched pairs of channel lists to determine optical paths of the network between pairs of said points;

wherein the step of detecting channel identities comprises detecting the channel identities of all of the optical channels in an optical signal at a multiplex port of each of a plurality of optical band filters to produce a respective channel list M, and determining a channel list T for a through port of the respective optical band filter, the channel list T comprising channels of the list M which are not within a pass band of the filter.

2. A method as claimed in claim 1 wherein the step of identifying matched pairs of channel lists comprises, for each of a plurality of nodes of the network, identifying matched pairs of channel lists among the channel lists M and T for different optical band filters of the node to determine optical paths within the node.

3. A method as claimed in claim 2 wherein the step of identifying matched pairs of channel lists further comprises, for each of the nodes, identifying any optically transparent optical band filters for which the channel lists M and T are the same, and identifying any channel lists, from among said matched pairs of channel lists of the node, matching said same channel lists M and T to determine optical connections of said optically transparent optical band filters within the node.

4. A method as claimed in claim 1 wherein the step of modulating each optical channel with a respective signal comprising a channel identity comprises variably attenuating an optical signal of the optical channel in dependence upon a signal comprising the respective channel identity.

5. A method as claimed in claim 4 wherein the signal comprising the respective channel identity has a frequency of the order of about 1 MHZ or less.

6. A method of determining topology of an optical WDM (wavelength division multiplex) network in which optical signals comprising a plurality of WDM optical channels are communicated among a plurality of nodes of the network, comprising the steps of:
    modulating each optical channel with a respective signal comprising a channel identity;
    for each of a plurality of optical paths entering or leaving each of a plurality of nodes, determining a channel list of all the optical channels in an optical signal on the optical path, this step comprising detecting the channel identities of all of the optical channels in an optical signal at each of a plurality of points; and
    identifying matching channel lists to determine optical paths of the network between the nodes;
wherein the step of determining a channel list of all the optical channels in an optical signal on an optical path entering or leaving a node comprises, for each node:
    detecting the channel identities of all of the optical channels in an optical signal at a multiplex port of each of a plurality of optical band filters of the node to produce a respective channel list M;
    determining a respective channel list T for an optical signal at a through port of the respective optical band filter, the channel list T comprising channels of the respective list M which are not within a pass band of the optical band filter;
    identifying matching channel lists M and T to determine optical paths within the node; and
    identifying unmatched channel lists M or T as channel lists for optical path entering or leaving the node.

7. A method as claimed in claim 6 wherein the step of identifying matching channel lists M and T to determine optical paths within the node comprises identifying any optically transparent optical band filters of the node for each of which the channel lists M and T are the same; identifying matched pairs of the other channel lists M and T for the node to determine optical paths between respective ports of different optical band filters within the node; and identifying any channel lists, from among said matched pairs of channel lists for the node, matching said same channel lists M and T to determine optical connections of said optically transparent optical band filters within the node.

8. A method as claimed in claim 6 wherein the step of modulating each optical channel with a respective signal comprising a channel identity comprises variably attenuating an optical signal of the optical channel in dependence upon a signal comprising the respective channel identity.

9. A method as claimed in claim 8 wherein the signal comprising the respective channel identity has a frequency of the order of about 1 MHz or less.

10. An optical WDM (wavelength division multiplex) network comprising a plurality of nodes and optical paths for communicating optical signals, comprising a plurality of WDM optical channels, within and among the nodes, the network comprising:
    a source for each optical channel;
    a modulator for modulating each optical channel with a respective signal comprising a channel identity;
    a plurality of optical filters for combining optical channels to produce optical signals and for separating optical signals to derive optical channels from the optical signals;
    a plurality of detectors for detecting the channel identities of all of the optical channels in an optical signal at each of a plurality of points in the network to produce a channel list for each of said points; and
    a network management system for identifying matched pairs of said channel lists to determine optical paths of the network between pairs of said points.

11. An optical WDM network as claimed in claim 10 wherein the optical filters comprise optical band filters each having a multiplex port, an add or drop port, and a through port, and said plurality of points in the network comprise multiplex ports of the optical band filters.

12. An optical WDM network as claimed in claim 11 wherein the network management system is arranged to determine a channel list for a through port of an optical band filter by omitting, from optical channels of a channel list for the multiplex port of the respective optical band filter, optical channels within a pass band of the optical band filter.

13. A method of determining topology of an optical WDN (wavelength division multiplex) network comprising a plurality of nodes and optical paths for communicating optical signals within and among the nodes, the optical signals comprising a plurality of WDM optical channels, the method comprising:
    modulating each optical channel with a respective signal comprising a channel identity;
    at a plurality of optical filters in the network, combining optical channels to produce optical signals and separating optical signals to derive optical channels from the optical signals;
    at a plurality off points in the network, detecting the channel identities of all of the optical channels in an optical signal at each of said points in the network to produce a channel list for each of said points; and
    at a network management system, identifying matched pairs of said channel lists to determine optical paths of the network between pairs of said points.

14. A method as claimed in claim 13 wherein the steps of combining and separating comprise combining optical channels into optical signals and separating optical signals into optical channels at the optical filters, which comprise optical band filters each having a multiplex port, an add or drop port, and a through port, and said plurality of points in the network comprise multiplex ports of the optical band filters.

15. A method as described in claim 14 wherein the step of identifying comprises identifying matched pairs at the network management system, which is arranged to determine a channel list for a through port of an optical band filter by omitting, from optical channels of a channel list for the multiplex port of the respective optical band filter, optical channels within a pass band of the optical band filter.

* * * * *

UNITED STATES PATENT AND TRADEMARK OFFICE
CERTIFICATE OF CORRECTION

PATENT NO. : 6,968,131 B2  Page 1 of 1
APPLICATION NO. : 09/963501
DATED : November 22, 2005
INVENTOR(S) : Obeda et al.

It is certified that error appears in the above-identified patent and that said Letters Patent is hereby corrected as shown below:

Column 4, line 42, "Mode" is corrected to read as --Node--.

Column 8, line 63, "BS" is corrected to read as --B5--.

Column 12, line 57, "off" is corrected to read as --of--.

Signed and Sealed this

Thirty-first Day of August, 2010

David J. Kappos
*Director of the United States Patent and Trademark Office*